US012020224B2

(12) United States Patent
Kurian et al.

(10) Patent No.: US 12,020,224 B2
(45) Date of Patent: Jun. 25, 2024

(54) ATM LEVERAGING EDGE DEVICES FOR OFFLINE PROCESSING

(71) Applicant: Bank of America Corporation, Charlotte, NC (US)

(72) Inventors: Manu Kurian, Dallas, TX (US); Siten Sanghvi, Jersey City, NJ (US); Heather Dolan, Sarasota, FL (US); George Albero, Charlotte, NC (US); Maharaj Mukherjee, Poughkeepsie, NY (US); Kevin A. Delson, Woodland Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 106 days.

(21) Appl. No.: 17/989,790

(22) Filed: Nov. 18, 2022

(65) Prior Publication Data

US 2024/0169332 A1     May 23, 2024

(51) Int. Cl.
    *G06Q 20/10*         (2012.01)
    *G06Q 20/32*         (2012.01)
    *G06Q 20/40*         (2012.01)

(52) U.S. Cl.
    CPC ..... *G06Q 20/1085* (2013.01); *G06Q 20/3221* (2013.01); *G06Q 20/3278* (2013.01); *G06Q 20/40145* (2013.01); *G06Q 20/4015* (2020.05)

(58) Field of Classification Search
    USPC ......................................................... 705/43
    See application file for complete search history.

(56) References Cited

U.S. PATENT DOCUMENTS

| 8,078,518 | B2 | 12/2011 | Goertz et al. |
| 8,185,457 | B1 | 5/2012 | Bear et al. |
| 8,281,985 | B1 | 10/2012 | Steinmetz et al. |
| 8,548,904 | B1 | 10/2013 | Bear et al. |

(Continued)

FOREIGN PATENT DOCUMENTS

ZA    WO 2019/220310 A1 * 11/2019 ............. H04L 29/06

OTHER PUBLICATIONS

Solomon et al., Design of a Customer-Centric Surveillance System for ATM Banking Transactions Using Remote Certification Technique, Feb. 23, 2021, 2020 IEEE 2nd International Conference on Cyberspace, pp. 104-111. (Year: 2021).*

*Primary Examiner* — Scott C Anderson
*Assistant Examiner* — George N. Proios
(74) *Attorney, Agent, or Firm* — Weiss & Arons LLP (57) ABSTRACT

A system for facilitating offline processing of electronic transactions at an ATM when the ATM does not support a network connection may be provided. The system may include a mobile device configured to store an updatable account balance of a personal account associated with a user of the mobile device and transaction data associated with a plurality of transactions executed via the mobile device. The system may include the ATM being configured to operate in an offline processing mode when the network connection is unsupported. The offline processing mode may include the ATM receiving a transaction request and account data from the mobile device. The ATM may be configured to authenticate or deny the executing of the transaction request based on a predetermined threshold of transaction locations positioned at a distance greater than or less than a pre-determined distance from the ATM.

20 Claims, 6 Drawing Sheets

(56) References Cited

U.S. PATENT DOCUMENTS

| | | | |
|---|---|---|---|
| 8,996,613 B2* | 3/2015 | Fan | 709/203 |
| 10,467,604 B1 | 11/2019 | Dorsch et al. | |
| 11,526,865 B2 | 12/2022 | Goodman et al. | |
| 2007/0288382 A1 | 12/2007 | Narayanan et al. | |
| 2010/0280871 A1 | 11/2010 | Goertz et al. | |
| 2011/0202466 A1 | 8/2011 | Carter | |
| 2012/0196586 A1* | 8/2012 | Grigg et al. | 455/418 |
| 2012/0208557 A1 | 8/2012 | Carter | |
| 2014/0324689 A1 | 10/2014 | Pinault | |
| 2016/0098700 A1* | 4/2016 | Johnson et al. | G06Q 20/3221 |
| 2016/0180307 A1* | 6/2016 | Laracey | G06Q 20/1085 |
| 2017/0053252 A1 | 2/2017 | Votaw et al. | |
| 2017/0262844 A1* | 9/2017 | Laracey | |
| 2017/0344962 A1* | 11/2017 | Agrawal et al. | G06Q 20/085 |
| 2018/0068297 A1 | 3/2018 | Goodman et al. | |
| 2019/0087817 A1 | 3/2019 | Adari | |
| 2019/0140935 A1 | 5/2019 | Kikinis | |
| 2019/0180259 A1 | 6/2019 | Deluca et al. | |
| 2019/0347631 A1* | 11/2019 | Mossoba et al. | G06Q 20/1085 |
| 2020/0175488 A1 | 6/2020 | Kulpati et al. | |
| 2020/0186355 A1 | 6/2020 | Davies | |
| 2020/0394626 A1 | 12/2020 | Kikinis et al. | |
| 2021/0073804 A1 | 3/2021 | Kikinis | |
| 2021/0224813 A1 | 7/2021 | Post | |
| 2021/0304165 A1 | 9/2021 | Deluca et al. | |
| 2021/0409956 A1 | 12/2021 | Wagner | |
| 2022/0277306 A1 | 9/2022 | Levitt et al. | |
| 2023/0028324 A1 | 1/2023 | Kikinis et al. | |
| 2023/0297998 A1 | 9/2023 | Yang et al. | |
| 2023/0306430 A1 | 9/2023 | Post | |
| 2023/0319664 A1* | 10/2023 | Arora et al. | H04W 36/30 |
| 2024/0013190 A1* | 1/2024 | Dolan et al. | G06Q 20/3224 |
| 2024/0054464 A1* | 2/2024 | Kurian et al. | G06Q 20/1085 |

* cited by examiner

ATM LEVERAGING EDGE DEVICES FOR OFFLINE PROCESSING

FIELD OF TECHNOLOGY

Aspects of the disclosure relate to offline processing of transactions leveraging edge devices at an automated teller machine ("ATM").

BACKGROUND OF THE DISCLOSURE

Digital systems play an integral role in the operations of nearly every enterprise across the globe. Large or small, enterprises rely on digital systems at all phases of their workflows. From communications and tracking to processing and record keeping, digital systems are the backbone of modern enterprises. One critical weakness inherent in the reliance on digital systems may arise in a situation where the digital systems rely on a connection to a principle, or central server.

In these situations, the enterprises may be vulnerable to a loss of connection to the central server. This may occur due to a malfunction with the connective elements, or an external factor such as a natural disaster that may disrupt the connectivity. A loss of connection to the central server may prevent the digital system from effectuating accurate updates and data provisioning vis-à-vis the central server.

An ATM is used widely by customers for performing transactions and the ATM relies on a central server for communicating, tracking and processing.

The communication may be enabled via a network connection supported by an entity associated with the ATM. However, sporadic loss of network connection does occur and the ATM may not be able to connect to the central server to process and complete transactions. The loss of network connection may be due to weather conditions, power loss, or any other similar disaster within the location of the ATM.

In circumstances where network connection between the ATM and the central server is not supported, it would be desirable for the ATM to support electronic transactions despite the loss of network connection to those affected by the disaster. However, due to inherent risks involved with off-line processing, such as a lack of current data, it is desirable to provide systems and methods to support offline ATM processes only for those customers who are truly affected by the disaster.

It would further be desirable, therefore, to provide systems and methods for supporting select transactions between a device and an offline ATM.

It would further be desirable, to embed account information and transaction data at the smartcard to further support transactions between the device and the offline ATM.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A system for facilitating offline processing of electronic transactions at an automated teller machine ("ATM") when the ATM does not support a network connection is provided. The offline processing of electronic transactions may be between a mobile device and the ATM.

The offline processing of electronic transactions may be triggered when a network connection that enables electronic communication between the ATM and a central server is disconnected. When the ATM attempts to connect to the central server and the connection is not supported, the system may switch the mode of processing to an offline mode.

The network connection, in some embodiments, may be an internet connection.

The ATM may be configured to store, at the ATM, account data associated with customers of the entity associated with the ATM. The account data stored locally may be updated automatically at pre-determined intervals of time. The pre-determined intervals may be once every hour, two hours, twice a day, daily and/or any other suitable time or interval.

The ATM may store a log of timestamps for each time the system updates the account data. When the network connection is not supported, the system may allow for a limited amount of time, transactions to be performed at the ATM.

The system may include the mobile device. The mobile device may be one of a smartphone, smart card, smart glasses, smart payment instrument, or any other suitable device configured for initiating transactions.

The mobile device may be configured to store a biometric of a user of the mobile device. The mobile device may also be configured to store an updatable account balance of a personal account associated with the user of the mobile device. The mobile device may further be configured to store transaction data associated with a plurality of transactions executed via the mobile device within a prior window of time.

The transaction data may include a transaction value for each transaction. The transaction data may also include a location where the transaction was executed. The transaction data may also include a transaction date for each transaction.

In some embodiments, the mobile device may be configured to store and update the account data at the mobile device each time a transaction is performed. When the mobile device is at a point-of-sale ("POS") device and interacts with the POS device to perform a transaction, the POS may be enabled to transmit updated account data to the mobile device following processing and executing of the transaction at the POS. The POS may be in direct communication with a financial entity for completing the transaction.

In some embodiments, the mobile device may be in electronic communication with an online application server for updating account data stored at the mobile device. The mobile device may be configured to retrieve from the central server, at pre-determined intervals, transaction data associated with a plurality of transactions executed on the mobile device.

When a network connection between the ATM and the central server is disconnected, the ATM may be configured to operate in an offline processing mode. The offline processing mode may include an ATM state wherein the ATM does not support the network connection.

The offline processing mode may be enabled when the ATM receives information that the mobile device transmitting a transaction request is a mobile device that includes user account data loaded and stored at the mobile device.

When the ATM is in the offline processing mode, the ATM may use one or more of a local connection, personal area connection and/or short-range connection for transmitting and receiving data from a local repository at the ATM.

The ATM, in offline processing mode, may be configured to receive a transaction request and the account data from the mobile device.

The transaction request may include a deposit, withdrawal, transfer, or any other suitable transaction that may be performed at an ATM.

The ATM may be configured to authenticate the user of the mobile device. The authenticating may include triggering a request for input of the biometric from the user for authenticating the user. Upon receipt of input of the biometric, the ATM may be configured to authenticate the user based on a comparison of the biometric stored at the mobile device to the biometric inputted at the ATM.

In response to the authenticating, the ATM may be configured to either deny or execute the transaction request. The denial or execution of the transaction request may be based on the data stored at the mobile device.

The transaction data stored at the mobile device may include the location where each transaction is performed. Often, a user of the mobile device performs transactions with the user's mobile device at locations that are within close proximity to the area where the user resides. However, the user of the mobile device may perform transactions using the mobile device in many different locations that may be distanced from the location of the ATM.

When the ATM loses network connection and the ATM is disconnected from the central server, this may be due to weather conditions, construction or any other similar occurrence. The ATM, during a system disconnect, may be limited to executing a predetermined amount of transactions. The ATM may be limited due to amount of available storage space within the ATM itself. The ATM may be limited due to the amount of available cash within the cash cartridges located at the ATM.

Because of the limits of the ATM during such occurrences, the system in certain embodiments may enable only customers that may reside within close proximity to the location of the ATM to have access to the available services during this time.

The ATM may compare the transaction locations of the transactions stored at the mobile device to the location of the ATM. The transaction locations may be based on the zip code of the locations included in the transaction data and the zip code where the ATM is situated.

In some embodiments, the ATM may determine the residential address of the user of the mobile device when determining whether to assist the user during offline processing mode.

When the transaction data stores more than a predetermined threshold of transaction locations positioned at a distance greater than a pre-determined distance from the ATM, the ATM may be configured to deny the request.

In some embodiments the pre-determined distance from the ATM is a pre-determined integer value of miles. In some embodiments, the pre-determined distance from the ATM is a pre-determined non-integer value of miles.

The pre-determined distance may be five miles, five and a half miles, ten miles, fifteen miles, seventeen and a half miles, twenty miles, or any other suitable distance.

When the transaction data stores more than the predetermined threshold of transaction locations positioned at a distance less than the pre-determined distance from the ATM, the ATM may be configured to execute the transaction request.

The executing of the transaction request may include executing the transaction request at the ATM by updating an account balance stored in a local data repository at the ATM. The updating may reflect the execution of the transaction request.

In some embodiments, the ATM may deny or accept the transaction request based on additional data stored within the account data at the mobile device. The denial or execution of the transaction request may be based on the transaction values of each transaction stored at the mobile device.

Following the updating of the account balance at the local data repository, the executing may include, transmitting an electronic communication to the mobile device confirming the execution of the transaction request.

The executing may also include transmitting transaction data associated with the transaction request into a transaction processing queue at the ATM. The transaction processing queue may be a queue within memory of the ATM, for temporarily storing transactions executed at the ATM while the ATM is in an offline processing state and waiting to be uploaded to the central server.

Following execution of the transaction request at the ATM, the mobile device may be configured to receive the electronic communication and update the account balance stored at the mobile device.

The mobile device may be configured to store a limited amount of transaction data at the mobile device. The amount may be based on an amount of available memory at the mobile device.

Following a transaction performed at the ATM, the mobile device may be configured to receive the transaction data and determine the amount of available storage. When the available storage has reached full capacity or close to the full capacity, the mobile device may be configured to free up storage space by deleting one or more transactions from memory. In some embodiments, the transaction data that has been stored first may be deleted first. This may be determined by the date of the transaction.

The transaction data that is stamped with the earliest date may be deleted from memory first. In some embodiments, data associated with one transaction may be deleted one at a time. Following each additional transaction data received, the mobile device may delete the next earliest dated transaction data.

When the network connection is re-established, the ATM may automatically reconnect to the central server and disable the offline processing mode.

Following a reconnection of the ATM to the central server, the ATM may transmit all transaction data stored in the transaction processing queue at the ATM.

The central server may be configured to process each transaction included in the transaction requests received from the transaction processing queue.

It should be appreciated that when the ATM is operating in the offline processing mode, the ATM may be limited to executing a pre-determined amount of transaction requests.

The pre-determined amount of transaction requests being executed may be based on an amount of available storage within the local data repository at the ATM and an amount of cash stored within a local cash cartridge at the ATM.

When the amount of cash stored within the local cash cartridge at the ATM is lower than a pre-determined threshold value, the ATM may be configured to limit an amount of funds enabled to be withdrawn per transaction request to a pre-determined limit. The pre-determined limit may be based on a level of trust of the user of the mobile device. The level of trust may be determined based on stored historical transactions and payment history of the user of the mobile device.

In some embodiments, when the central server receives the transaction requests from the transaction processing queue, the central server may verify the transaction requests by transmitting an electronic notification to the user of the mobile device for verifying the transaction request. The user may receive the electronic notification via an email, text message, pop-up notification or any other similar mode of electronic communication.

The pop-up notification may be displayed on a user interface of an application associated with the user's personal account.

In response to a receipt of the verification from the user, the central server may be configured to process the transaction request.

In some embodiments, the communication between the mobile device and the ATM may be enabled using a short-range communication. Short-range communication may include one or more of near-field communication ("NFC"), light-fidelity ("Lifi") and Bluetooth® or any other suitable short-range communication.

The transaction processing queue may hold the transaction data and the associated transfer pending a re-establishment of the internet connection. Once the internet connection has been re-established, the online account associated with each of the users of the first and second mobile devices may be updated based on the local transfer. The central server may perform a double check for authenticity of the transaction request since the transaction request was executed at a time when the network connection was down.

In some embodiments, when network connection is re-established between the ATM and the central server, the central server may be configured to retrieve from the mobile device, an activity log of executions performed by the mobile device. The central server may further be configured to confirm that the transaction request received at the ATM is included in the activity log. Following confirming, the central server may be configured to process the transaction request by updating the personal account of the user at the central server based on the transaction request.

In some embodiments, a method for facilitating offline processing of electronic transactions at an automated teller machine ("ATM") when the ATM does not support a network connection is provided. The offline processing of electronic transactions may be between a mobile device and the ATM. The method may include, via the ATM, receiving, at the ATM, a transaction request and account data from a mobile device when the ATM is in an offline processing mode.

It should be appreciated that the ATM may be configured to operate in an offline processing mode when the network connection is unsupported.

Following receipt of the transaction request, the method may include authenticating the user of the mobile device. The authenticating may include triggering a request for input of a biometric from the user for authenticating the user. Following input of the biometric at the ATM, the method may include authenticating the user based on a comparison of the biometric stored at the mobile device to the biometric inputted by the user at the ATM. The biometric may be an iris recognition, fingerprint, body movement, voice recognition or any other suitable biometric.

In response to the authenticating the method may include denying or executing the transaction request. Wherein, when transaction data stored at the mobile device includes a predetermined threshold of transaction locations positioned at a distance greater than a pre-determined distance from the ATM, the ATM may be configured to deny the request.

When the transaction data stored at the mobile device includes the predetermined threshold of transaction locations positioned at a distance less than the pre-determined distance from the ATM, the ATM may be configured to execute the transaction request. The executing of the transaction request may include executing the transaction request at the ATM. Following execution, the method may include updating an account balance stored in a local data repository at the ATM. The updating may reflect the execution of the transaction request.

The method may further include transmitting an electronic communication to the mobile device confirming the execution of the transaction request. The method may further include transmitting transaction data associated with the transaction request into a transaction processing queue at the ATM. The transaction request may be stored temporarily in the queue pending re-connection between the ATM and the central server. Once network connection is re-established, the transaction requests may be uploaded to the central server for final processing and updating of the user's account at the central server.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
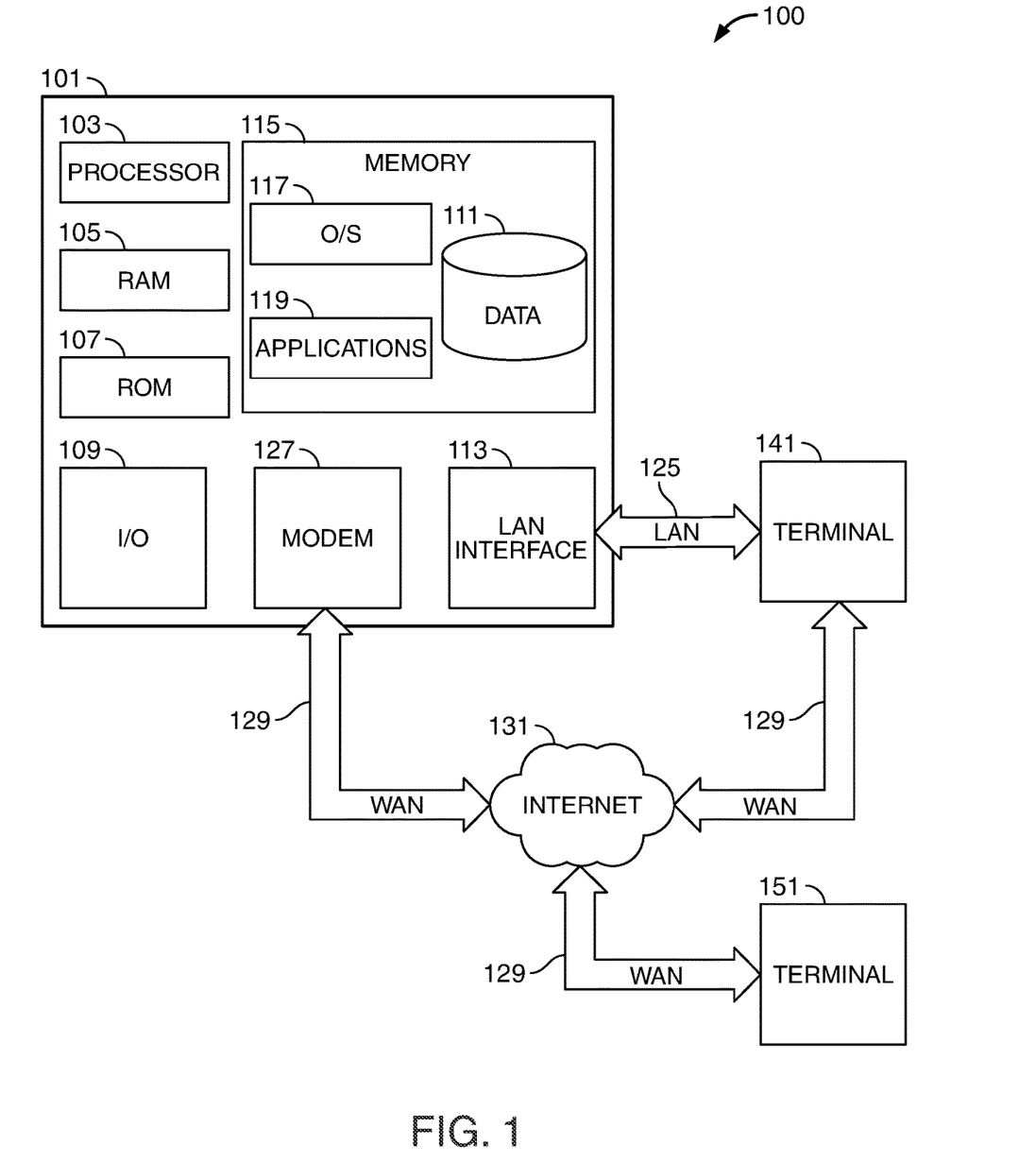
FIG. 1 shows an illustrative block diagram of apparatus in accordance with principles of the disclosure.

FIG. 1 shows an illustrative block diagram of system 100 that includes computer 101. Computer 101 may alternatively be referred to herein as an "engine," "server" or a "computing device." Computer 101 may be any computing device described herein, such as the computing devices running on the one or more of the ATM, smart phones, smart cars, smart cards and any other mobile device described herein. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory. Memory 115 may be memory within the smart card 326 and/or memory at the ATM 404.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

In some embodiments, computer 101 may be the ATM 404 and Terminals 141 and 151 may be the central server 402, and/or any of the mobile devices that may be in electronic communication with ATM 404 via LAN, WAN or any other suitable short-range communication when network connection 406 may not be established.

When used in a LAN networking environment, computer 101 is connected to LAN 125 through a LAN interface 113 or an adapter. When used in a WAN networking environment, computer 101 may include a modem 127 or other means for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a PAN such as Bluetooth® NFC, ZigBee, or any other suitable personal area network. Short-range communication may be initiated when network connection between ATM 404 and central server 402 is not supported.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smart phones, multi-processor systems, microprocessor-based systems, cloud-based systems, programmable consumer electronics, network PCs, minicomputers, mainframe computers, distributed computing environments that include any of the above systems or devices, and the like.

Figure 2:
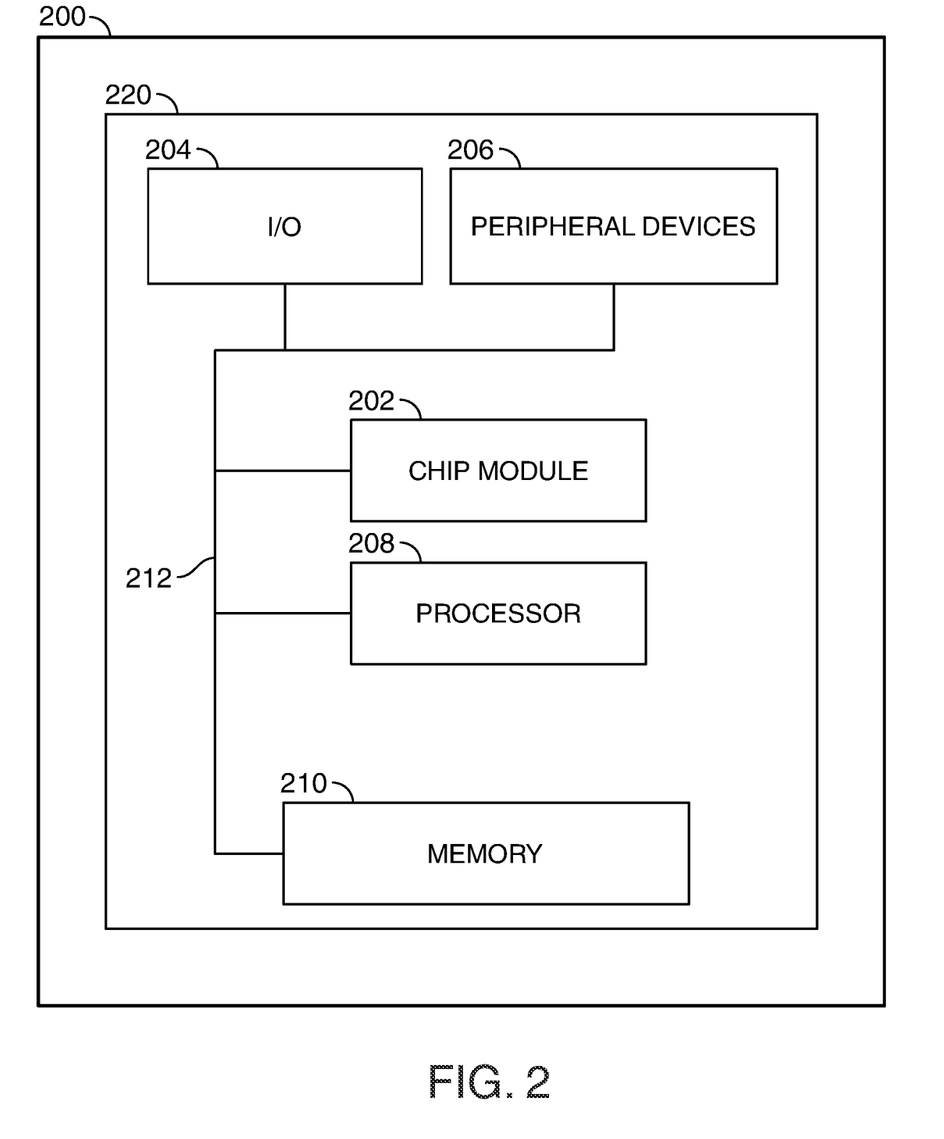
FIG. 2 shows an illustrative apparatus that may be configured in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
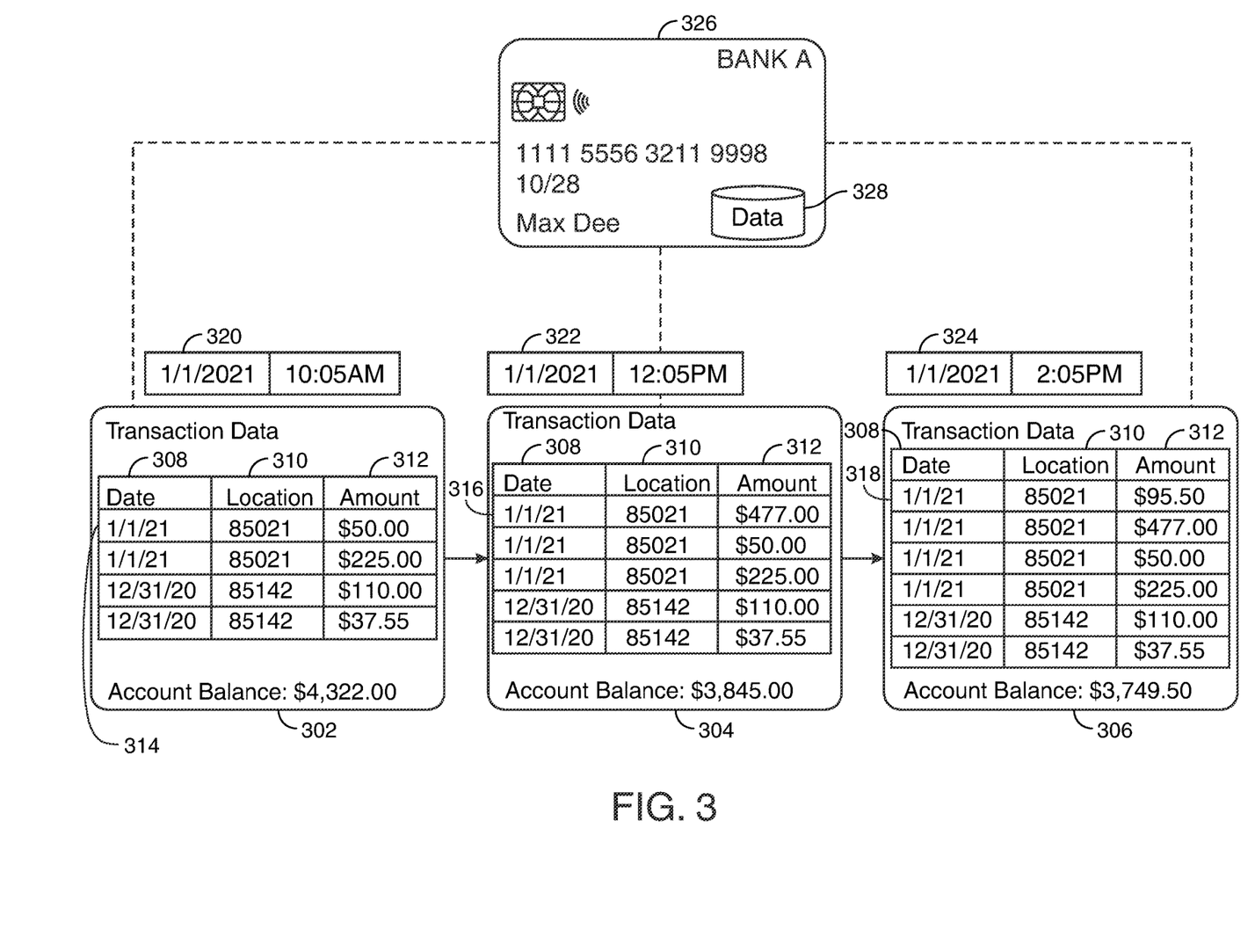
FIG. 3 shows an illustrative diagram in accordance with principles of the disclosure.

FIG. 3 shows an illustrative diagram of account data stored on a mobile device. In this illustrative diagram, the mobile device is a smart card. Smart card 326 may be associated with a user of the smart card 326. Smart cards 302, 304, and 306 may display transaction data stored at smart card 326 at different intervals.

The account data stored at the smart card 326 may be, in some embodiments, updated following each transaction performed using smart card 326. In some embodiments, the account data may be updated at pre-determined intervals.

In this exemplary diagram, smart card 302 may be updated at 10:05 am on Jan. 1, 2021, as shown at 320. The transaction data stored at smart card 302 may include a date for each transaction 308, a location where the transaction was executed 310 and a transaction value associated with the transaction 312.

The location 310 may be a zip code of the location of the POS device where the transaction may have been executed.

The four most recent transactions may be stored at smart card 302. The account balance stored at smart card 302 may be the balance of the account of the user of smart card 302 following the last transaction 314.

At smart card 304, the account data may be updated at 12:05 pm on Jan. 1, 2021, as shown at 322. The account data stored at 304 may be the same account data shown at 302. An additional transaction may have been executed, as shown at 316. The account balance may be updated following the last transaction 316.

It should be appreciated that prior to storing each additional transaction executed via the smart card, the smart card may determine the amount of available memory at the smart card. When there is insufficient storage space and/or limited memory available, the smart card may delete the most dated transaction from the smart card and then store the most recent transaction.

At smart card 306, an additional transaction is stored, as shown at 318. The account data may have been updated at 2:05 pm on Jan. 1, 2021, as shown at 324. The account balance at 306 may be updated following the execution of transaction 318.

Figure 4:
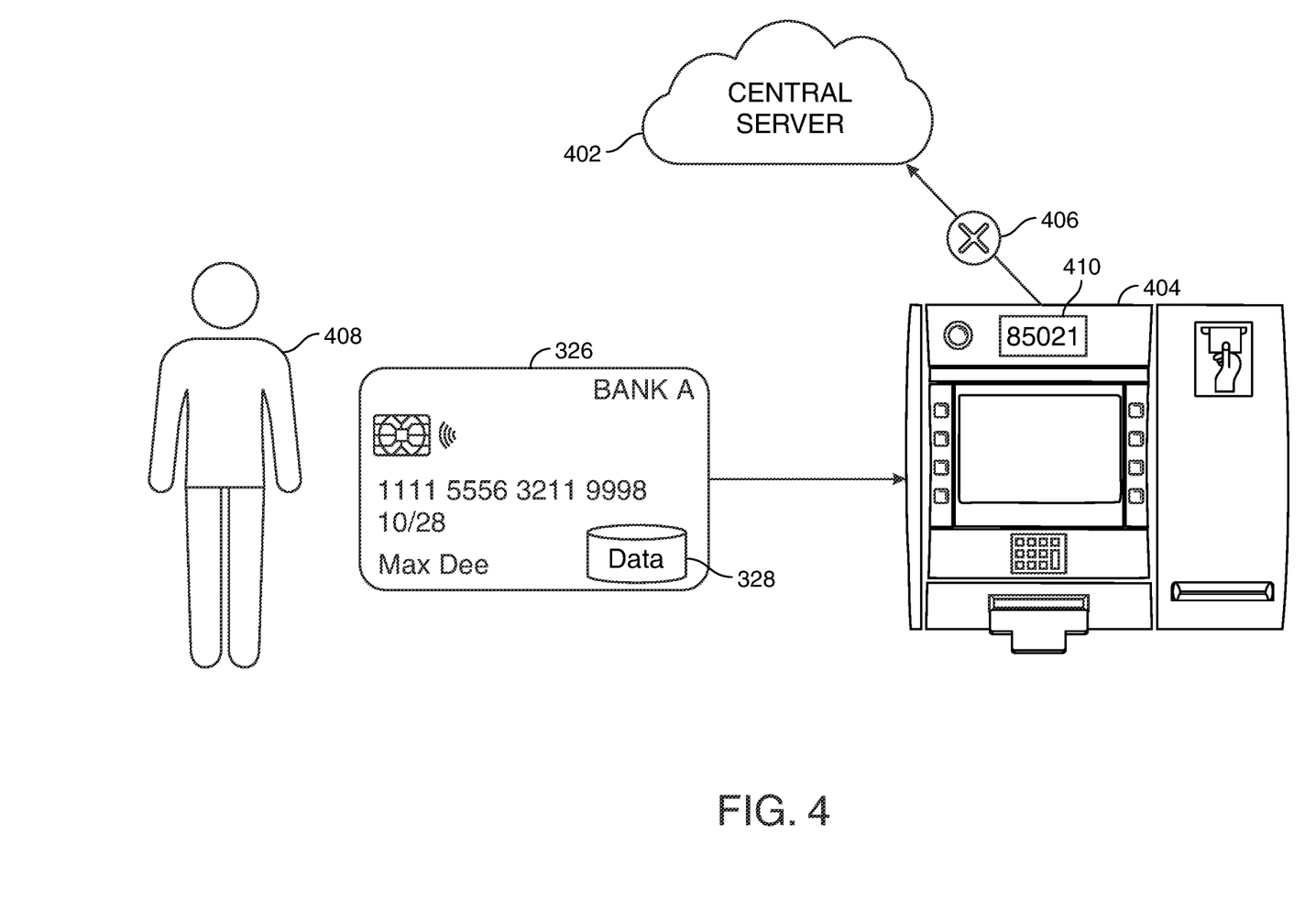
FIG. 4 shows an illustrative diagram in accordance with principles of the disclosure.

FIG. 4 shows an illustrative diagram of a user 408 of smart card 326 interacting with ATM 404. Smart card 326 may be the same smart card shown at FIG. 3. Smart card 310 may include the account data shown at 306. The account data may be stored in a local repository of the smart card, as shown at 328.

User 408 may be attempting to perform a transaction via smart card 306 at ATM 404. ATM 404 may have lost network connection. ATM 404 may not be enabled to connect to the central server 402 as shown at 406. The network connection may be unsupported. ATM 404 may automatically be triggered to proceed to operate in an offline processing mode. The offline processing mode may enable ATM 404 to execute transactions based on updated account data stored at the ATM in a local data repository.

It should be appreciated that when network connection is supported between ATM 404 and central server 402, the local data repository at ATM 404 may be continuously updated to maintain a most current balance of customer's accounts associated with the entity of ATM 404.

Additionally, smart card 326 may include memory 328 that may also be updated to maintain and store transaction data and account balance associated with the personal account of user 408. By storing transaction data and the account balance, user 408 may be enabled to use smart card 326 at an ATM when the ATM is in an offline processing mode.

ATM 404, when in the offline processing mode, may execute transactions attempted to be executed at the ATM based on one or more pre-determined criteria. ATM 404 may be in offline processing mode due to a disaster, weather conditions or any other similar occurrence that may cause the network connection to be disconnected.

During conditions when network connection is unsupported and the ATM is limited in functionality, the ATM may be available first to customers that may reside within the area where the ATM is situated. As shown at 410, ATM 404 may be in a location where the zip code is 85021.

Upon inserting and/or scanning the smart card 326 at ATM 404, ATM 404 may analyze the transaction data stored at smart card 326 to determine the location where the user 408 resides.

Figure 5:
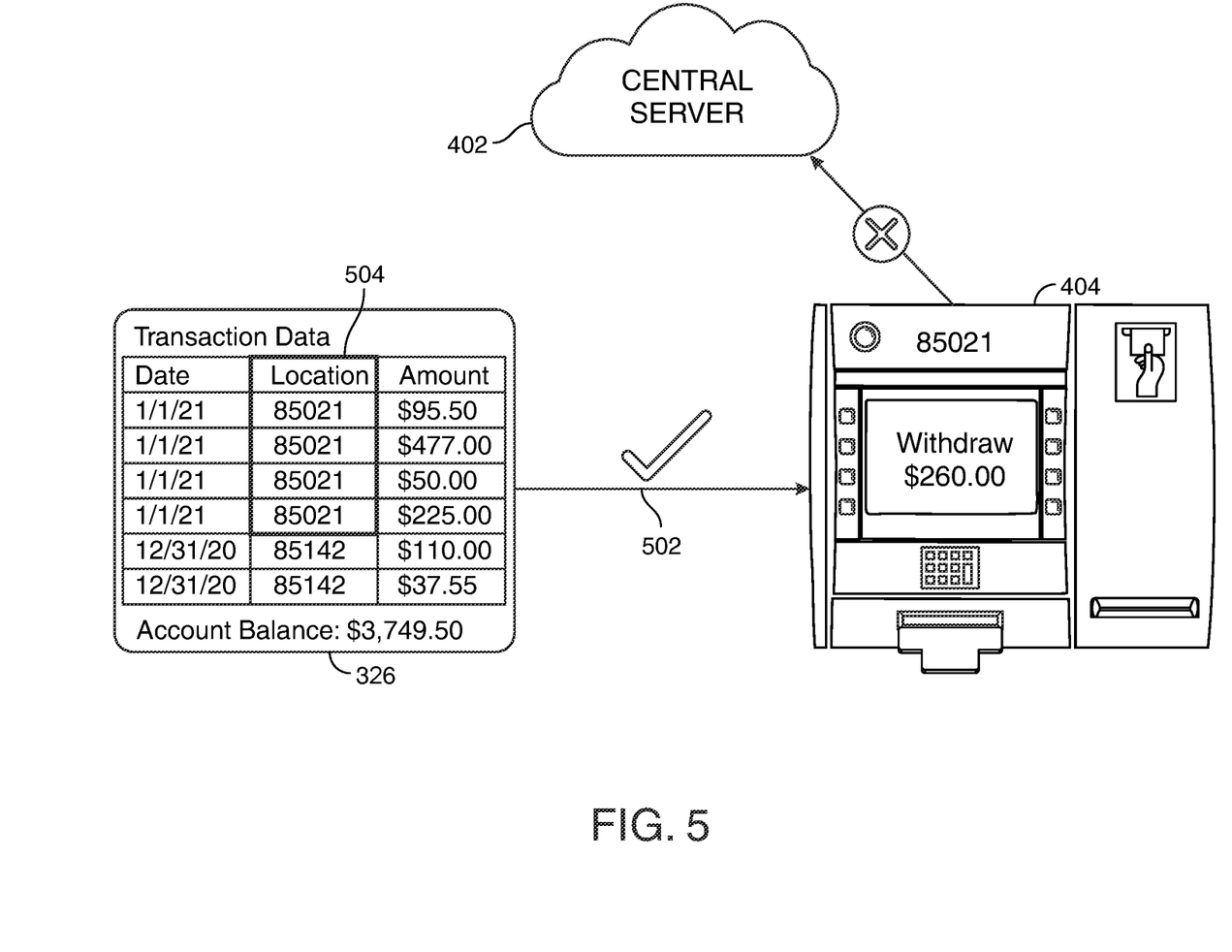
FIG. 5 shows an illustrative diagram in accordance with principles of the disclosure.

FIG. 5 shows an illustrative diagram of smart card 326 following ATM 404 analyzing the transaction data stored at 326. ATM 404 may analyze the locations 504 associated with each transaction. Four of the transactions may have been executed within the same zip code as ATM 404 is situated. Two of the transactions may have been executed at a location greater than a pre-determined threshold distance to the ATM.

ATM 404 may determine to accept the transaction request received from smart card 326, as shown at 502, based on the analysis that more than the predetermined threshold of transaction locations are positioned at a distance less than the pre-determined distance from the ATM.

Figure 6:
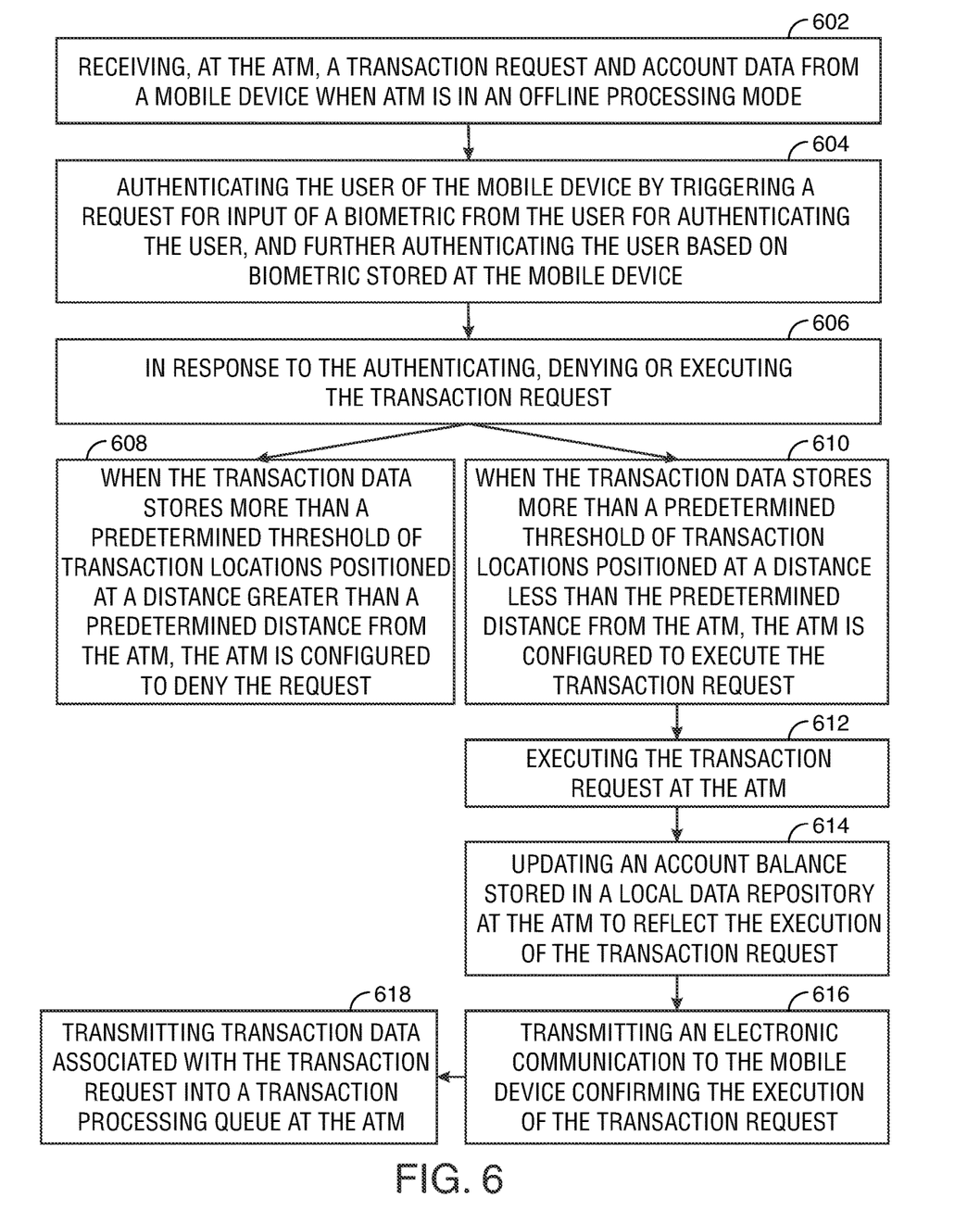
FIG. 6 shows an illustrative diagram in accordance with principles of the disclosure.

FIG. 6 shows an illustrative method in accordance with principles of the disclosure.

At 602, the method steps may include receiving, at the ATM, a transaction request and account data from a mobile device when the ATM is in an offline processing mode.

At 604, the method steps may include authenticating the user of the mobile device by triggering a request for input of a biometric from the user in order to authenticate the user. The authenticating may be based on comparison of a biometric stored at the mobile deice, to the biometric inputted by the user at the ATM.

At 606, the method steps may include, in response to the authenticating, denying or executing the transaction request based on transaction locations stored at the mobile device.

At 608, the method steps may include, when the transaction data stores more than a predetermined threshold of transaction locations positioned at a distance greater than a predetermined distance from the ATM, the ATM may be configured to deny the request.

At 610, the method steps may include, when the transaction data stores more than a predetermined threshold of transaction locations positioned at a distance less than the predetermined distance from the ATM, the ATM may be configured to execute the transaction request.

At 612, the method steps may include executing the transaction request at the ATM.

At 614, the method steps may include updating an account balance stored in a local data repository at the ATM to reflect the transaction request.

At 616, the method steps may include transmitting an electronic communication to the mobile device confirming the execution of the transaction request.

At 618, the method steps may include transmitting transaction data associated with the transaction request into a transaction processing queue.

Thus, systems and methods for facilitating offline processing of electronic transactions at an ATM when the ATM does not support a network connection is provided. Persons skilled in the art will appreciate that the present invention can be practiced by other than the described embodiments, which are presented for purposes of illustration rather than of limitation.

What is claimed is:

1. A system for facilitating offline processing of electronic transactions at an automated teller machine ("ATM") when the ATM does not support a network connection, the offline processing of electronic transactions being between a mobile device and the ATM, the system comprising:
the mobile device configured to store account data comprising:
a biometric of a user of the mobile device;
an updatable account balance of a personal account associated with the user; and
transaction data associated with a plurality of transactions executed via the mobile device within a prior window of time, the transaction data comprising, for each of the plurality of transactions:
a transaction value;
a location where the transaction was executed; and
a transaction date;
the ATM configured to operate in an offline processing mode when the network connection is unsupported, the offline processing mode comprising an ATM state wherein the ATM does not support the network connection, the offline processing mode including:
receiving a transaction request and the account data from the mobile device;
authenticating the user of the mobile device, the authenticating comprising triggering a request for input of the biometric from the user for authenticating the user, and further authenticating the user based on a comparison of the biometric stored at the mobile device; and
in response to the authenticating, denying or executing the transaction request as follows:
when the transaction data stores more than a predetermined threshold of transaction locations positioned at a distance greater than a pre-determined distance from the ATM, the ATM is configured to deny the request; and
when the transaction data stores more than the predetermined threshold of transaction locations positioned at a distance less than the pre-determined distance from the ATM, the ATM is configured to execute the transaction request, the executing of the transaction request comprising:
executing the transaction request at the ATM;
updating an account balance stored in a local data repository at the ATM, the updating to reflect the execution of the transaction request;
transmitting an electronic communication to the mobile device confirming the execution of the transaction request; and
transmitting transaction data associated with the transaction request into a transaction processing queue at the ATM;
the mobile device configured to:
receive the electronic communication and update the account balance stored at the mobile device; and
store, at the mobile device, transaction data associated with an execution of the transaction request performed at the ATM; and
a central server, when network connection is re-established, is configured to:
receive the transaction data from the transaction processing queue; and
process the transaction request at the central server.

2. The system of claim 1 wherein the denying or executing of the transaction request is based on the transaction data stored at the mobile device including:
the transaction value;
the location where the transaction is executed; and
the transaction date.

3. The system of claim 2 wherein the location where the transaction is executed is a zip code.

4. The system of claim 3 wherein the pre-determined distance from the ATM is a pre-determined integer value of miles.

5. The system of claim 3 wherein the pre-determined distance from the ATM is a pre-determined non-integer value of miles.

6. The system of claim 1 wherein when the ATM is operating in the offline processing mode, the ATM is limited to executing a pre-determined amount of transaction requests.

7. The system of claim 6 wherein the pre-determined amount of transaction requests being executed is based on an amount of available storage within the local data repository at the ATM and an amount of cash stored within a local cash cartridge at the ATM.

8. The system of claim 7 wherein, when the amount of cash stored within the local cash cartridge at the ATM is lower than a pre-determined threshold value, the ATM is configured to limit an amount of funds enabled to be withdrawn per transaction request to a pre-determined limit.

9. The system of claim 1 wherein the central server is further configured to:
    transmit an electronic notification to the user of the mobile device for verifying the transaction request;
    receive, from the user, verification of the transaction request; and
    in response to a receipt of the verification, process the transaction request at the central server.

10. The system of claim 1 wherein the mobile device is one of a smart card, smartphone, smart glasses, smart watch and payment instrument.

11. The system of claim 1 wherein the network connection is an internet connection.

12. The system of claim 1 wherein the receiving of the transaction request and account data from the mobile device is performed via a short-range communication comprising one of near-field communication ("NFC"), light-fidelity ("Lifi") and Bluetooth®.

13. A system for facilitating offline processing of electronic transactions at an automated teller machine ("ATM") when the ATM does not support a network connection, the offline processing of electronic transactions being between a mobile device and the ATM, the system comprising:
    the mobile device being in electronic communication with an online application server, the mobile device configured to:
        store, within a local repository at the mobile device, account data including a biometric of a user of the mobile device and an updatable account balance associated with a personal account of the user; and
        retrieve, at pre-determined intervals, transaction data associated with a plurality of transactions executed on the mobile device, the transaction data comprising, for each transaction:
            a transaction value;
            a location where the transaction was executed; and
            a transaction date;
    the ATM configured to operate in an offline processing mode when the network connection is unsupported, the offline processing mode comprising an ATM state wherein the ATM does not support the network connection, the offline processing mode including:
        receiving a transaction request, the account data and the transaction data from the mobile device;
        authenticating the user of the mobile device, the authenticating comprising triggering a request for input of the biometric from the user for authenticating the user, and further authenticating the user based on a comparison of the biometric stored at the mobile device; and
        in response to the authenticating, denying or executing the transaction request as follows:
            when the transaction data stores more than a predetermined threshold of transaction locations positioned at a distance greater than a pre-determined distance from the ATM, the ATM is configured to deny the request; and
            when the transaction data stores more than the pre-determined threshold of transaction locations positioned at a distance less than the pre-determined distance from the ATM, the ATM is configured to execute the transaction request, the executing of the transaction request comprising:
                executing the transaction request at the ATM;
                updating an account balance stored in a local data repository at the ATM, the updating to reflect the execution of the transaction request;
                transmitting an electronic communication to the mobile device confirming the execution of the transaction request; and
                transmitting transaction data associated with the transaction request into a transaction processing queue at the ATM;
    the mobile device configured to:
        receive the electronic communication and update the account balance stored at the mobile device; and
        store, at the mobile device, transaction data associated with an execution of the transaction request performed at the ATM; and
    a central server, when network connection is re-established, is configured to:
        receive the transaction data from the transaction processing queue;
        retrieve from the mobile device, an activity log of executions performed by the mobile device;
        confirm that the transaction request received at the ATM is included in the activity log; and
        following confirming, process the transaction request by updating the personal account of the user at the central server based on the transaction request.

14. The system of claim 13 wherein the confirming that the transaction request received at the ATM is included in the activity log further comprises, confirming that a timestamp of a transmittal of the transaction request to the ATM recorded in the activity log is within a range of time of a timestamp of a receipt of the transaction request at the ATM.

15. The system of claim 13 wherein the account balance is maintained on the mobile device by receiving an updated account balance from a server associated with the online account following each transaction performed and overwriting the account balance stored at the local repository of the mobile device.

16. The system of claim 13 wherein the location of each purchase is a zip code associated with the location.

17. The system of claim 16 wherein the pre-determined distance from the ATM is a pre-determined integer value of miles.

18. The system of claim 16 wherein the pre-determined distance from the ATM is a pre-determined non-integer value of miles.

19. The system of claim 13 wherein when the ATM is operating in the offline processing mode, the ATM is limited to executing a pre-determined amount of transaction requests.

20. A method for facilitating offline processing of electronic transactions at an automated teller machine ("ATM") when the ATM does not support a network connection, the offline processing of electronic transactions being between a mobile device and the ATM, the method comprising:

receiving, at the ATM, a transaction request and account data from a mobile device when the ATM is in an offline processing mode, the ATM configured to operate in an offline processing mode when the network connection is unsupported, the account data comprising:
a biometric of a user of the mobile device;
an updatable account balance of a personal account associated with the user; and
transaction data associated with a plurality of transactions executed via the mobile device within a prior window of time, the transaction data comprising, for each of the plurality of transactions:
a transaction value;
a location where the transaction was executed; and
a transaction date;
authenticating the user of the mobile device, the authenticating comprising triggering a request for input of a biometric from the user for authenticating the user, and further authenticating the user based on a comparison of the biometric stored at the mobile device; and
in response to the authenticating, denying or executing the transaction request as follows:
when transaction data stored at the mobile device comprises a predetermined threshold of transaction locations positioned at a distance greater than a pre-determined distance from the ATM, the ATM is configured to deny the request; and
when the transaction data stored at the mobile device comprises the predetermined threshold of transaction locations positioned at a distance less than the pre-determined distance from the ATM, the ATM is configured to execute the transaction request, the executing of the transaction request comprising:
executing the transaction request at the ATM;
updating an account balance stored in a local data repository at the ATM, the updating to reflect the execution of the transaction request;
transmitting an electronic communication to the mobile device confirming the execution of the transaction request; and
transmitting transaction data associated with the transaction request into a transaction processing queue at the ATM.

\* \* \* \* \*